Dec. 16, 1969  TAKEO GOTSUJI  3,484,257

METHOD OF MOLDING AND PACKAGING CHOCOLATE CAKES

Filed July 17, 1967  2 Sheets-Sheet 1

INVENTOR

Takeo Gotsuji

BY Ken W. Flocks

ATTORNEY

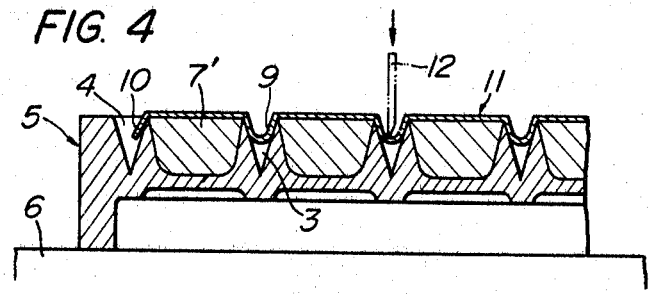
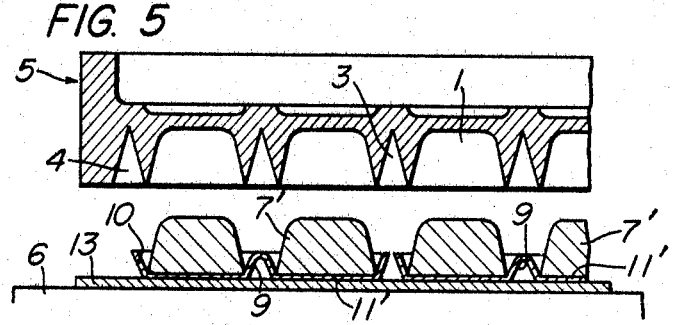
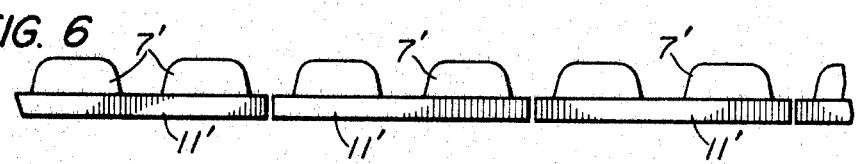
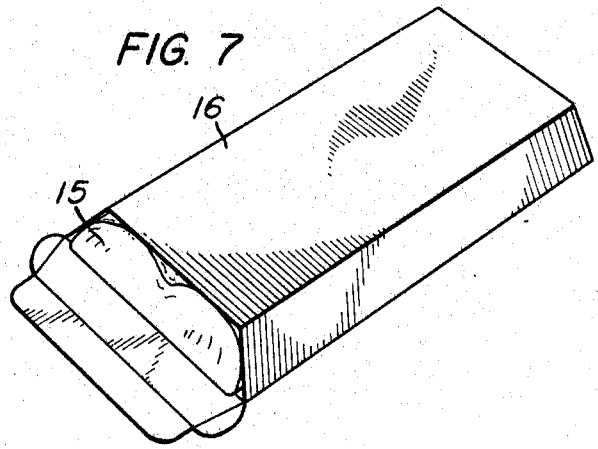

United States Patent Office 3,484,257
Patented Dec. 16, 1969

3,484,257
METHOD OF MOLDING AND PACKAGING CHOCOLATE CAKES
Takeo Gotsuji, Tokyo, Japan, assignor to Fujiya Confectionery Co., Ltd., Tokyo, Japan, a corporation of Japan
Filed July 17, 1967, Ser. No. 653,741
Claims priority, application Japan, Apr. 13, 1967, 42/23,144
Int. Cl. A23g 3/00; B65b 23/00
U.S. Cl. 99—180                    1 Claim

ABSTRACT OF THE DISCLOSURE

A method of shaping and packaging chocolate cakes, comprising molding the chocolate cakes by a shaping mold having a number of mold units arranged in longitudinal as well as lateral rows, covering the open top of said shaping mold with a base plate material, cutting said base plate material longitudinally and/or laterally between the rows of chocolate cakes into individual base plates, turning said shaping mold upside-down keeping said individual base plates intact, separating the molded chocolate cakes on the individual base plates from the associating mold units by lifting said shaping mold and packaging said chocolate cakes in a box as they rest on each of said individual base plate.

BACKGROUND OF THE INVENTION

Field of the invention

The present invention relates to a method of packaging a multiplicity of chocolate cakes, molded in a single mold, in a prescribed arrangement and number in an efficient manner.

Description of the prior art

Heretofore, chocolate cakes have been packaged in a box mostly by manual operation and therefore packaging operation has been a process which requires most labor expenses in the production of chocolate cakes on a commercial basis. Such high labor expenses will obviously be reduced drastically if the packaging operation could be carried out by mechanical means. In recent years, however, the kinds of chocolate cakes, e.g. in terms of number in which they are packaged, have been increasing, whereas the production quantity required for each kind of chocolate cakes has been decreasing. Therefore, mechanization of the packaging operation for every kinds of chocolate cakes would require a huge investment, even if such mechanization is possible, and it is for this reason that reduction of the production cost cannot be achieved with ease.

SUMMARY OF THE INVENTION

The object of the present invention, therefore, is to provide a method which enables the operation of packaging chocolate cakes in a box to be achieved at high efficiency with less labor. Namely, according to the present invention, there is provided a method of molding and packaging chocolate cakes, which comprises charging a liquid chocolate in each of integral mold units arranged in a chocolate cake shaping mold in a multiplicity of longitudinal and lateral rows spaced from each other by lateral grooves and longitudinal grooves respectively, soldifying said liquid chocolate in said respective mold units, placing on top of said shaping mold a base plate material having longitudinal and lateral ribs adapted to be received in said respective longitudinal and lateral grooves in said shaping mold, cutting said base plate material on said shaping mold along the selected longitudinal and/or lateral ribs thereof into individual base plates of a predetermined size, turning said shaping mold upside-down keeping said individual base plates intact, removing said shaping mold from the molded chocolate cakes resting on said individual base plates and then packaging said chocolate cakes together with each of said individual base plates.

In order that the present invention may be more clearly understood, reference will now be had to the accompanying drawings in which the present invention is illustrated by way of example.

BRIEF DESCRIPTION OF THE DRAWING

FIGURES 3 to 7 are enlarged fragmentary side elevations and a perspective view respectively, illustrating the steps of chocolate cake molding and packaging operation according to the present invention.

DESCRIPTION OF THE PREFERRED EMBODIMENT

Figure 1:
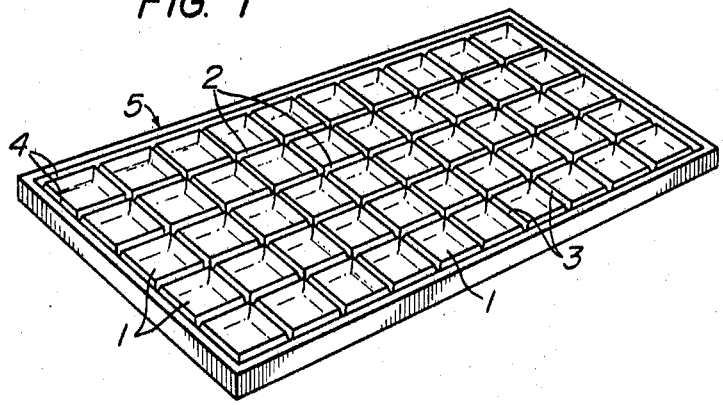
FIGURE 1 is a perspective view of a chocolate cake shaping mold.
Figure 2:
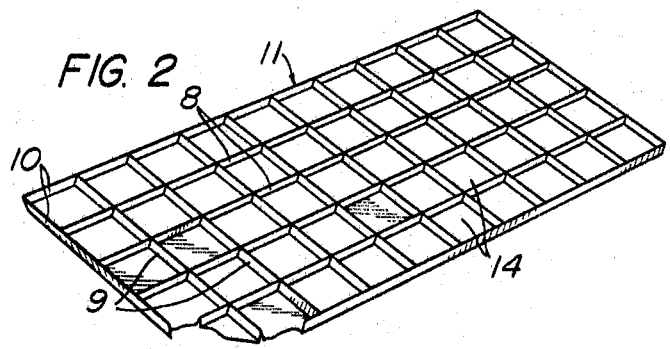
FIGURE 2 is a perspective view, partly broken away, of a base plate member.
Figure 3:
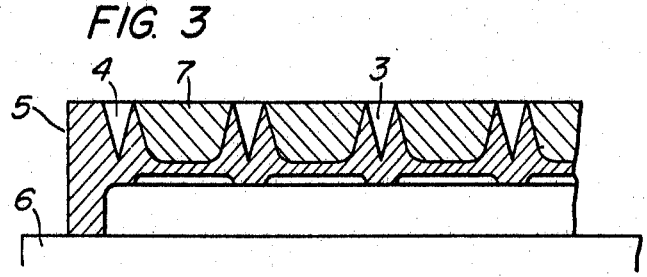

Referring to the drawing and particularly to FIG. 1, the shaping mold 5 is made of a metal or a hard synthetic resin and comprises a frame section and integral mold units 1 of a suitable configuration for molding chocolate cakes therein, which mold units are arranged in five longitudinal rows each consisting of ten mold units and ten lateral rows each consisting of five mold units, and each of which mold units is spaced from the adjacent mold units longitudinally by a series of lateral grooves 3 and laterally by a series of longitudinal grooves 2. The mold units in the outermost rows are spaced from the frame section of the shaping mold longitudinally and laterally by a peripheral groove 4. Referring next to FIG. 2, there is shown a base plate material 11 which is made of a hard vinyl chloride in thickness of about 0.3 mm. and is formed with longitudinal ribs 8 and lateral ribs 9, which have a substantially wedge-shaped cross sectional configuration, and a flexed peripheral edge having a height smaller than the depth of and being adapted to be received in the corresponding longitudinal grooves 2, lateral grooves 3 and the peripheral groove 4 of the shaping mold as shown in FIG. 4. The shaping mold 5 is placed on a suitable table 6 in the manner shown in FIG. 3 and a liquid chocolate is charged in each mold unit 1 and solidified therein. Thereafter, the base plate material 11 is mounted on top of the shaping mold 5 with the longitudinal ribs 8, lateral ribs 9 and flexed peripheral edge 10 thereof facing downwardly such that said longitudinal ribs, lateral ribs and flexed peripheral edge are received in the corresponding longitudinal grooves 2, lateral grooves 3 and peripheral groove 4 respectively. The base plate material 11 is then cut along every other lateral ribs into individual base plates 11' of a prescribed size, by a cutter 12 being lowered from above the base plate material, following which a holding plate 13 of a size substantially the same as or slightly larger than the shaping mold is superposed on tops of the individual base plates 11'. The shaping mold is turned upside-down keeping the holding plate intact and then is separated from the molded chocolate cakes 7' by lifting it upwardly in the manner shown in FIG. 5. The molded chocolate cakes 7' are separated from the associating mold unit 1 and retained in the corresponding concaves 14 formed by each of the individual base plate 11' as shown in FIG. 6. Then, each base plate 11' and the chocolate cakes 7' securely held thereon in an orderly arrangement are wrapped together with a moisture-proof sheet 15, such as aluminum foil, and packaged in a decorative packaging sack or box 16, to complete the entire molding and packaging operation.

The individual base plates 11' may be made of styrol or other thin hard synthetic resin sheet or paper, instead of the thin hard vinyl chloride sheet. Further, it will be obvious that the size of the individual base plates 11' may be varied optionally by properly selecting the longitudinal ribs 8 and lateral ribs 9 along which the base plate material 11 is cut. It is also to be noted that the grooves 2 and 3, and ribs 8 and 9, may be of any cross sectional configuration other than those shown in the figures, but the wedge-shaped cross section of the grooves and ribs, and the height of the ribs smaller than the depth of the grooves, as illustrated in the figures, are advantageous because the ribs may be cut readily by merely applying the cutter 12 to the backside of the ribs with pressure.

In the embodiment described herein, the portions of the flexed peripheral edge which are to be cut, i.e. the portions of the flexed peripheral edge on the extensions of the longitudinal or lateral ribs along which the base plate material 11 is to be cut, are cut simultaneously with said longitudinal or lateral ribs, but alternatively these portions may be separated beforehand as by forming thereat a line cut during the production stage of said base plate material.

According to the method of the present invention described hereinabove, separation of the molded chocolate cakes from the shaping mold and mounting them on the individual base plate of a desired sized in a predetermined number, can be accomplished all at once and furthermore the molded chocolate cakes can be retained in an orderly arrangement on the individual base plate, since they are received in the concaves provided by the base plate. Thus, by employing the claimed method, it is possible to carry out the chocolate cake packaging operation easily at high efficiency, with much less labor than that required heretofore for manually arranging the chocolate cakes on a base plate in a predetermined number upon separation of the same from a shaping mold and packaging the chocalate cakes and the base plate in a box. In addition, it is possible according to the present invention to avoid inadvertent error in counting the number of chocolate cakes to be placed on one base plate.

I claim:

1. A method of molding and packaging chocolate cakes, which comprises charging a liquid chocolate in each of integral mold units arranged in a chocolate cake shaping mold in a multiplicity of longitudinal and lateral rows spaced from each other by lateral grooves and longitudinal grooves respectively, solidifying said liquid chocolate in said respective mold units, placing on top of said shaping mold a base plate material having longitudinal and lateral ribs adapted to be received in said respective longitudinal and lateral grooves in said shaping mold, cutting said base plate material on said shaping mold along the selected longitudinal and/or lateral ribs thereof into individual base plates of a predetermined size, turning said shaping mold upside-down keeping said individual base plates intact, removing said shaping mold from the molded chocolate cakes resting on said individual base plates and then packaging said chocolate cakes together with each of said individual base plates.

References Cited

UNITED STATES PATENTS

| 2,217,392 | 10/1940 | Warfield | 99—180 |
| 2,689,798 | 9/1954 | Bond | 99—180 |
| 2,793,955 | 5/1957 | Selmer. | |
| 3,107,027 | 10/1963 | Hong. | |

TIM R. MILES, Primary Examiner

U.S. Cl. X.R.

107—8